Patented May 30, 1933

1,912,175

UNITED STATES PATENT OFFICE

EARL BLOUGH, OF PITTSBURGH, AND HARRY V. CHURCHILL, OF PARNASSUS, PENNSYLVANIA, ASSIGNORS TO ALUMINUM COMPANY OF AMERICA, OF PITTSBURGH, PENNSYLVANIA, A CORPORATION OF PENNSYLVANIA

ALKALINE DETERGENT COMPOSITIONS AND METHOD OF RENDERING THE SAME NONCORROSIVE TO ALUMINUM

No Drawing. Application filed June 28, 1928, Serial No. 289,072. Renewed July 14, 1932.

The use of "collapsible tubes" and other receptacles made of aluminum as containers for various substances has been seriously restricted by the fact that aluminum is susceptible to ready attack by alkalies and hence use of aluminum containers has been confined the substances which are neutral in reaction. This has, for example, prevented the use of collapsible tubes of aluminum as containers even for such mildly alkaline detergents as tooth paste, shaving cream, etc., despite the fact that aluminum not only can be made soft or pliable enough for easy expulsion of the tube contents but has the important advantage of much greater tensile strength than tin, thus making aluminum tubes markedly less subject to rupture in use. Moreover, the cost of aluminum tubes is considerably less than that of tin tubes and wider use would tend to a still greater price difference. As stated, however, aluminum is readily corroded by alkalies, and the consequent weakening of the thin walls of the tubes has effectually prevented use of the metal in a field where otherwise it would find advantageous and extensive employment.

We have found that in general the corrosive effect or action upon aluminum of the mild alkalies commonly used in detergents of the character referred to, as for example borates, oleates and stearates, can be inhibited to an extent adequate for all practical purposes by the presence of sodium silicate in solution in the plastic detergent, thus permitting such detergents to be packed in collapsible tubes and other containers, made of or lined with aluminum, notwithstanding the fact, which has long been known, that sodium silicate in solution has itself a corrosive action upon aluminum. It has also been found that in some cases the lathering of saponaceous compositions like shaving creams is beneficially affected by the sodium silicate, the bubble walls of the lather being slightly toughened or stiffened.

The amount of sodium silicate needed for the purpose of our invention is, in general, extremely small, so small in fact that its detection by ordinary methods of analysis is difficult. The amount used depends somewhat upon the ratio of sodium oxide to silicon oxide in the silicate, and we have found that for efficient results the ratio of sodium oxide to silicon dioxide should not be much above 1:3.25. Good results have been obtained with sodium silicate having a specific gavity of about 1.395 (water=1), corresponding to 41° Bé, with the above value of the sodium oxide to silicon oxide ratio. Good results have also been obtained with a ratio of 1:3.86. Using the silicate referred to (41° Bé, $Na_2O:SiO_2=1:3.25$) we find a pint per 400 pounds of the paste or cream is in general sufficient, and that in some cases much less can be used, say a half-pint per 400 pounds. The silicate is preferably added in liquid form, to facilitate uniform distribution in the mass of detergent. It will be understood that the nature and amount of alkali present in the soap is an important factor in determining the amount of silicate and that the proportions for any one of the very large number of detergents with which we are here concerned can be easily found by trial. The silicate referred to above (s. g. 1.395) contains, approximately, 8.9 per cent of $Na_2O$ and 29.0 per cent of $SiO_2$, the rest being water. A half-pint of the material per 400 pounds of the detergent is equivalent to about 0.2 per cent of the entire mass, and corresponds to a $Na_2O+SiO_2$ content of about 0.07 per cent. In general a sodium silicate content between about 0.1 and 0.4 per cent, approximately, gives good results.

The sodium silicate can be added to the mass of tooth paste, shaving cream, or other alkaline detergent at any suitable stage of manufacture of the latter, or after it is compounded and is otherwise ready for filling the containers with the usual measured quantities, but preferably after the saponification reaction is complete. In any case the silicate should be thoroughly and uniformly distributed by adequate mixing, to insure that each container will have a sufficient amount of the corrosion-inhibitor. We prefer to add the silicate in liquid form.

It is to be understood that the invention is not limited to the specific details herein described but can be carried out in other ways without departure from its spirit.

We claim—

1. Method of packaging mildly alkaline detergent compositions for sale, comprising incorporating a relatively small amount of sodium silicate in a mass of the detergent with substantially uniform distribution therethrough and thereafter enclosing measured portions of the mass in aluminum containers.

2. The method of packaging plastic mildly alkaline detergent compositions for sale, comprising incorporating in the composition with substantially uniform distribution therethrough a relatively small proportion of sodium silicate having an $Na_2O$ to $SiO_2$ ratio of not more than about 1:3.25 and a specific gravity of about 1.395, and enclosing measured quantities of the composition in collapsible tubes of aluminum.

3. A plastic mildly alkaline detergent composition packaged for sale in an aluminum collapsible tube and containing a relatively small amount of sodium silicate serving to inhibit corrosion of the aluminum by the alkali of the composition.

4. A mildly alkaline detergent composition packaged for sale in an aluminum collapsible tube and containing about 0.1 to 0.4 per cent of sodium silicate serving to inhibit corrosion of the aluminum by the alkali of the composition.

5. A plastic mildly alkaline detergent composition packaged for sale in an aluminum collapsible tube and containing about 0.2 per cent of sodium silicate having an $Na_2O$ to $SiO_2$ ratio of about 1:3.25 and a specific gravity of about 1.395.

6. A mildly alkaline detergent composition packaged in an aluminum receptacle and containing a relatively small amount of sodium silicate serving to inhibit corrosion of the aluminum by the alkali of the composition.

7. A mildly alkaline detergent composition containing about 0.07 to 0.4 per cent of sodium silicate serving to inhibit corrosion of an aluminum container when the composition is packaged therein.

8. A plastic mildly alkaline detergent composition containing about 0.1 to 0.4 per cent of sodium silicate, having an $Na_2O$ to $SiO_2$ ratio of about 1:3.25 and a specific gravity of about 1.395, serving to inhibit corrosion of an aluminum container when the composition is packaged therein.

9. A plastic mildly alkaline detergent composition containing about 0.2 per cent of sodium silicate, having an $Na_2O$ to $SiO_2$ ratio of about 1:3.25 and a specific gravity of about 1.395, serving to inhibit corrosion of an aluminum container when the composition is packaged therein.

In testimony whereof we hereto affix our signatures.

EARL BLOUGH.
HARRY V. CHURCHILL.